April 10, 1934.     H. HEINE     1,954,755
MICROSCOPE
Filed June 18, 1932
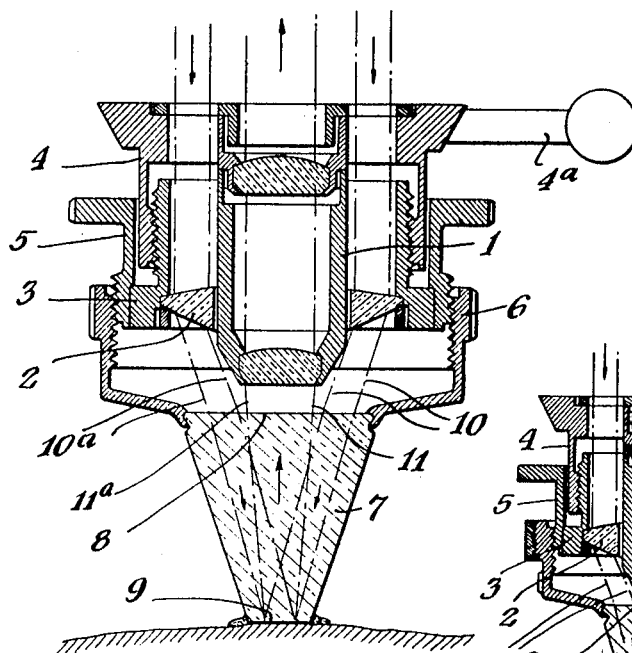
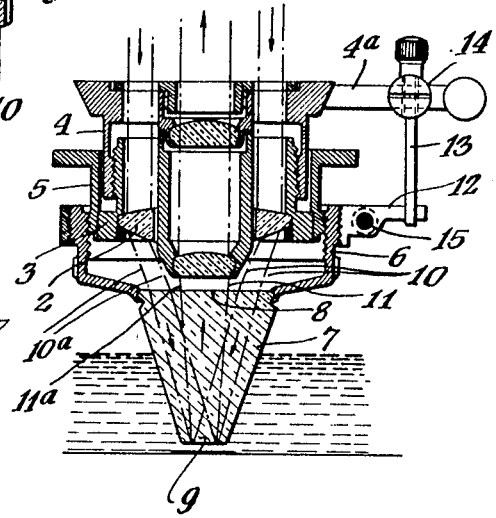
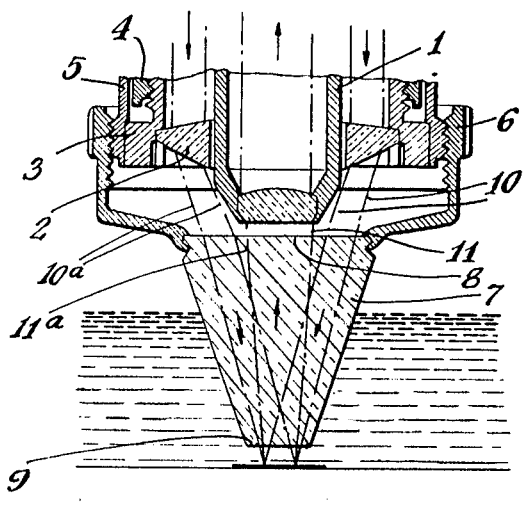
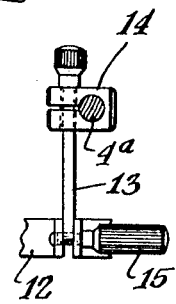
INVENTOR
Hermann Heine
BY
ATTORNEY Patented Apr. 10, 1934

1,954,755

UNITED STATES PATENT OFFICE 1,954,755

MICROSCOPE

Hermann Heine, Wetzlar, Germany, assignor to the firm: Ernst Leitz, Optische Werke, Wetzlar, Germany Application June 18, 1932, Serial No. 617,982
In Germany December 5, 1931

1 Claim. (Cl. 88—40)

This invention relates to improvements in microscopes, particularly microscopes in which the illuminating rays are directed onto the object by means of a glass condenser from the aperture of the objective not used for the picturing, said glass condenser being adjustably mounted about a dry objective, particularly an immersion extension placed before the objective, and serving to provide a path for the illuminating rays and which is so constructed that its upper surface can be so elevated that the image rays at their exit from said surface are located within the point of entrance of the illuminating rays into said surface and so that the immersion member can be adjusted within the space between the frontal lens system and the surface of an object.

Such microscopes have the disadvantage that during the observation of humid or fatty surfaces the illuminating rays generate reflections on the surface of the object which reach the objective and interfere with the observations.

These disadvantages are successfully overcome by the objects of the present invention according to which a glass body is associated with the object by an immersion liquid, so that the formation of obnoxious reflections at the surface of the object is prevented by the immersion.

By this construction an illumination of the surface within the limit of the image rays is made impossible by locating the image rays at their exit from the surface of the immersion member within the entrance point of the illuminating rays at the surface.

Another advantage obtained by my construction is to be seen in the arrangement of the immersion member adjustable upwards or downwards while the objective is correctly focused upon the object without changing the focus.

By this construction on the one hand it is possible to keep the distance between the frontal surface of the immersion member and the surface of the object so small that the immersion fluid is kept in place by adhesion between the object and the frontal face of the member, and on the other hand, that the object is flattened or kept in place by the frontal surface of the immersion member.

Moreover, the immersion member serves furthermore as body to be immersed into fluids while the space between the front face of the immersion member and the object is kept so far elevated that any desired changes may be made on the object by means of a pin or tweezers.

Furthermore, when observations are to be made in turbid liquids the adjustment between immersion member and objective permits a restriction or limitation of the space between them so as to make the fluid as transparent as possible.

These and other objects of my invention will become more fully known as the description thereof proceeds and will then be more specifically defined in the appended claim.

In the accompanying drawing forming a material part of this disclosure:

Fig. 1 shows the lower part of a microscope constructed according to my invention, with the immersion member moved with its front face close to an object.

Fig. 2 is a similar view with the immersion member within a fluid not moved entirely down to the object.

Fig. 3 is a view, similar to Figure 2, of a modified form of my invention.

Fig. 4 is a detail view of a connection between handle and setting of the immersion member.

As illustrated in Figures 1 and 2, the objective in its frame 1 is surrounded by a ring-shaped condenser lens 2 within its frame 3 and adjustment sleeve 5 in which the frame 3 is held by a supporting body 4 provided with a handle 4a by engagement of the threaded outer face of frame 3 with the threaded inner part of body 4.

A ring 6 is threaded upon the lower threaded part of sleeve 5 and carries at its lower inwardly bent part an immersion member 7.

The upper face of this member is designated 8 and its frontal face is named 9. The light rays 10, 10a, deflected by the condenser 2 are laid upon the surface 8 of the immersion member outside of the path of the image rays 11, 11a. By turning the ring 6 the immersion member 7 can be brought closer to the frontal lens of the objective or farther away therefrom.

In the form of my invention illustrated in Figures 3 and 4, the objective is designated 1 and the ring condenser 2 is arranged in an adjustable frame 3 having a regulating member 5 adjustably arranged in a supporting body 4 of the illuminating and observation optics.

An immersion member 7 is kept in an adjustable setting 6 so that the illuminating rays 10, 10a, can enter the member 7 the form of which is suited to the path of the light rays.

The point of exit of the image rays 11, 11a, is located within the point of entrance of the illuminating rays within the surface of the immersion member 7. The setting 6 is connected with the handle 4a by the intermediary of elements 12, 13, 14, and 15.

It will be understood that I have described and shown the preferred forms of my invention only as some examples of the many possible ways to practically construct my invention, and that I may make such changes in the general arrangement of my apparatus and in the construction of my apparatus and in the construction of its minor details as come within the scope of the appended claim without departure from the spirit of my invention and the principles involved.

Having thus described my invention what I claim as new, and desire to secure by Letters Patent is:

In a microscope an objective, a ring-shaped condenser lens surrounding said objective, a frame for said condenser lens having a threaded outer face, a supporting body for said objective frame having an inner thread engaging the thread of said frame, an adjustment sleeve for said frame supporting body, a handle for said body, a ring member threaded upon the lower threaded part of said sleeve, an immersion member carried by the lower inwardly bent part of said ring member, elements connecting said ring member and handle, for the adjustment of said immersion member in a vertical direction without disturbing the focus of the objective, and for keeping the distance between the frontal surface of the immersion member and the surface of the object to be observed so small that the immersion fluid is kept in place by adhering between the object to be observed and the frontal face of the immersion member while the object to be observed is kept in place by the frontal surface of the immersion member, the surface of said immersion member so arranged as to locate the image forming rays at their point of exit from the surface within the point of entrance of the illuminating rays.

HERMANN HEINE.